United States Patent [19]

Kuehl et al.

[11] 4,219,406

[45] Aug. 26, 1980

[54] CATALYTIC CRACKING WITH ZEOLITE-CONTAINING SILICA-ALUMINA HYDROGEL CATALYST

[75] Inventors: Guenter H. Kuehl; Howard S. Sherry, both of Cherry Hill, N.J.

[73] Assignee: Mobil Oil Corporation, New York, N.Y.

[21] Appl. No.: 732,553

[22] Filed: Oct. 15, 1976

[51] Int. Cl.$^2$ ............... C10G 11/04; B01J 29/08
[52] U.S. Cl. ............... 208/120; 252/453
[58] Field of Search ............... 208/120; 252/448, 453, 252/455 R, 455 Z

[56] References Cited

U.S. PATENT DOCUMENTS

| | | | |
|---|---|---|---|
| 2,453,585 | 11/1948 | Payne et al. | 252/451 |
| 2,900,349 | 8/1959 | Schwartz | 252/452 X |
| 3,140,249 | 7/1964 | Plank et al. | 208/120 |
| 3,140,253 | 7/1964 | Plank et al. | 208/120 |
| 3,520,828 | 7/1970 | Rosinski | 252/453 |
| 3,595,611 | 7/1971 | McDaniel et al. | 208/120 X |
| 3,816,342 | 6/1974 | Plank et al. | 208/120 X |
| 3,823,092 | 7/1974 | Gladrow | 252/455 Z |
| 3,930,987 | 1/1976 | Grand | 208/120 X |
| 3,939,058 | 2/1976 | Plank et al. | 208/120 |
| 3,957,623 | 5/1976 | McDaniel et al. | 208/120 |

*Primary Examiner*—Delbert E. Gantz
*Assistant Examiner*—G. E. Schmitkons
*Attorney, Agent, or Firm*—Charles A. Huggett; Raymond W. Barclay; Claude E. Setliff

[57] ABSTRACT

A specially prepared zeolite-containing silica-alumina hydrogel gives a catalyst that is attrition resistant, more active catalytically, more selective and more stable. The hydrogel is prepared by steps including nozzle mixing of reactants to form a hydrogel, ion exchanging with ammonium, aluminum and rare earth ions, washing, drying and impregnating with rare earths.

6 Claims, No Drawings

CATALYTIC CRACKING WITH ZEOLITE-CONTAINING SILICA-ALUMINA HYDROGEL CATALYST

BACKGROUND OF THE INVENTION

1. Field of the Invention

The invention relates to a crystalline aluminosilicate zeolite-containing silica-alumina cracking catalyst and to a method of preparing same. More particularly, it relates to such catalyst that is made attrition resistant, more active, selective and stable by steps comprising forming a hydrogel, wet processing and homogenizing same, spray drying and rare earth impregnation.

2. Discussion of the Prior Art

Cracking catalysts are sold materials that have acidic properties. Because of the nature of the reactions taking place, the catalyst must have high porosity. Furthermore, since the catalyst circulates rapidly between reaction zones and burning, or regeneration zones, it must also have resistance to abrasion, temperature changes and the like.

Natural catalysts are composed principally of silica and alumina, but they contain certain other materials which may be harmful under certain circumstances. The synthetic silica-alumina materials are generally made from pure materials so that many of the shortcomings of the natural materials have been overcome. However, the catalysts made using silica-alumina prepared by prior art processes are subject to excessive attrition, aging and loss of activity and selectivity. The invention as described hereinafter has not been described or suggested in any prior art of which applicants are aware.

SUMMARY OF THE INVENTION

The invention provides a cracking catalyst comprising a silica-alumina hydrogel made by the steps comprising:

(1) nozzle-mixing of an acid alum stream comprising an aqueous solution of aluminum sulfate and sulfuric acid with a second stream comprising an aqueous solution of sodium silicate, an alkali metal hydroxide and suspended fines;
(2) passing the resulting sol to a dispersing devise to form droplets and causing these droplets to gel;
(3) exchanging the gel by contacting same, in order, with (a) an ammonium salt solution, (b) an aluminum salt solution and (c) a rare earth salt solution;
(4) washing with water;
(5) homogenizing;
(6) spray drying;
(7) impregnating with rare earth ions;
(8) drying.

The invention also provides a method of making the catalyst and a process for using the catalyst in the cracking of hydrocarbons.

In the above, alkali metal is preferably sodium.

DESCRIPTION OF SPECIFIC EMBODIMENTS

Silica-alumina catalysts have been known for many years and are generally divided into those prepared for use in FCC units and those for use in TCC units. The fluid cracking catalysts are often prepared to contain an active crystalline zeolite, the balance being clay or amorphous silica-alumina. They are prepared as microspheroidal particles and generally contain from about 12 to about 28% of the active crystalline zeolite. The catalysts of this invention will contain from about 5 to about 30%, by wt., of the total catalyst of the zeolite. Total fines in the catalyst will be between about 40% and about 60% by wt.

There are several problems inherent in cracking catalysts made by the processes of the prior art. As has been touched on previously these are mainly attrition and loss of activity and selectivity. We have found a process for preparing catalysts via all-embracing silica-alumina hydrogels which provides catalysts that overcome the stated disadvantages of prior art catalysts.

In the first step of the process of this invention, an acid alum solution and a sodium silicate stream containing a substantial portion of fines are pumped to a mixing nozzle where they mix to form a sol. This is one of the critical aspects of this invention. If the desired advantage of attrition resistance is to be attained, the reactants must be nozzle-mixed.

The "acid alum" is an aqueous solution of sulfuric acid and aluminum sulfate. The sodium silicate solution contains waterglass, and sodium hydroxide. The composition of the forming stream is adjusted so that the desired gel composition is obtained with a favorable gelation time. The fines used comprise finely dispersed kaolin clay, calcined rare earth exchanged zeolite Y and recycle fines from the spray dryer (final step in this process).

The second step of the process requires forming gel droplets. The size of such droplets will range from about 0.1 mm to about 15 mm. This step is not critical and may be accomplished by forming droplets in the conventional way, i.e., by dropping the sol through oil where it gels, or by passing the sol as it comes from the nozzle to a rotating disc, from which small droplets spin off and gel while falling through air. While the step is not, per se, critical, it is believed that certain advantages are to be gained by air-forming droplets by use of a spinning disc. Thus, it is believed that easier processing of the hydrogel is permitted. Ion exchange and washing of the hydrogel rather than of the spray-dried gel is for best attrition resistance.

We prefer to use air forming, which, under the preferred conditions of the instant process, yields beads of approximately 1 mm in diameter. Typically, a cylindrical forming chamber was used. A spinning disc with either a flat or a concave surface may be employed, and the speed thereof will range between 200 and 1500 rpm. Optimum conditions for forming 0.2 to 1 mm diameter spheres were found to be 1000 rpm with a 4-inch disc with the forming streams preheated to 90–92° F. Such air forming of beads is an expedient method for producing small bead sizes suitable for wet processing on a filter.

The third process step is a critical one in that the advantages are realized only if the sequence of exchange is (1) exchange with ammonium ions, (2) exchange with aluminum ions and (3) exchange and/or impregnation with rare earth ions. The anions associated with the ammonium, aluminum and rare earth cations may be any that are easily removed from the gel by washing. These include the sulfate, nitrate and chloride ions. In this step, at least 60% of the original cation should be removed.

When using the rotating disc to form gel beads, the gel may drop from the rotating disc through air into a gel aging tank containing the desired concentration of ammonium salt in solution, usually around 2% in water, for the first exchange. The concentration is not critical, and more or less salt may be used.

Following the ammonium ion exchange, the slurry of beads is dewatered in the first section of a compartmented belt filter and ion exchanged with an aluminum salt solution. The preferred concentration of aluminum salt in solution is about 1.5%, since it has been shown that little is gained from using higher strength solutions.

Upon completion of the aluminum ion exchange, the product is washed with water and then exchanged with rare earth ions by contacting with a solution of a rare earth salt, e.g., the chloride. Conditions therein are conventional, since the method of rare earth exchange in and of itself is not critical. This exchange is followed by washing with water to remove any free salts.

The hydrogel is homogenized, as for example, by being passed sequentially through a Charlotte Mill and a Manton-Gaulin homogenizer. The viscosity is adjusted by addition of water and the material is dried counter-currently in a spray dryer. The product is re-slurried with a rare earth salt solution, as for example, a rare earth chloride solution, contacted for 15 minutes to 5 hours or more, and dewatered. It is then slowly dried in a conventional dryer.

When rare earth ions are mentioned, it will be understood that such will be contained in a salt or a mixture of salts wherein the anion can be a chloride, nitrate or acetate. The rare earth ion may be, for example, cerium, lanthanum, praseodymium, neodymium, samarium and yttrium. Furthermore, mixtures of rare earth salts can be used.

With reference to the exchange steps, we do not wish to be bound by any theory, but we do offer the following as one explanation of why (in our opinion) the sequence is a critical one. It is believed that the porosity of the catalyst particles is adjusted in the ammonium ion exchange step by controlling the degree to which the gel continues to cross-link after gelling. The porosity in them influences the activity and particularly the selectivity of the catalyst. The step of exchanging with the aluminum ion, besides removing the sodium ion, increases the attrition resistance by further cross-linking the partially or completely aged gel. Rare earth exchange imparts superior steam stability to the finished product, and by placing into the catalyst, by impregnation, such a high percentage of $RE_2O_3$, one gets a catalyst having superior catalytic selectivity.

The preferred catalyst comprises, as already mentioned, an all-embracing gel. By this is meant a hydrogel matrix which embraces all the fines to be incorporated in the catalyst. That is, at the instant of formation, there is no separable water phase present as it is in the case of precipitates, including hydrous oxide precipitates.

The suspended fines called for in step (1) of the Summary include one or more crystalline aluminosilicate zeolites, as for example, rare earth exchanged Y-zeolite. Such fines also include inorganic solids that have no effect on the cracking action of the catalyst but whose presence increases the attrition resistance of the final catalyst. Among these latter solids can be mentioned alumina and kaolin clay. In addition, recycle fines from the spray drying step may be used.

It should be mentioned that the steps of exchanging, spray drying, impregnating and drying are conventional and well known in the art. For example, typical ion exchange procedures are described in U.S. Pat. Nos. 3,140,249; 3,140,251 and 3,140,253. Such procedures comprise contacting the zeolite with a salt of the desired replacing ion at from about 40° F. to about 120° F. Drying temperatures may range from about 150° F. to about 600° F.

Having described the invention in general terms, the following examples are offered as illustrations thereof.

EXAMPLE 1

Acid Alum:
 87.58% $H_2O$
 0.75% $Al_2(SO_4)_3$
 11.67% $H_2SO_4$ (100%)
 Spec. Gravity at 60° F.: 1.087 g/cc
Silicate solution:
 95.82% waterglass (8.9% $Na_2O$, 28.7% $SiO_2$)
 4.18% NaOH (100%)
Fines-Silicate Forming Stream:
 55.41% silicate solution
 1.52% $H_2O$
 10.45% of 30% REY (3% Na) slurry
 14.29% of 55% Georgia kaolin slurry
 18.33% of 15% recycle (ball-milled) slurry All slurries were stabilized with 0.6% Marasperse N before mixing. The recycle used contained 12% REY.

Acid alum and fines-silicate were preheated to 95° F. and nozzle-mixed at the rate of 390 cc of fines-silicate per minute to 335 cc of acid alum per minute. The fines-silicate were passed through the inner orifice (0.031"). The acid alum was passed through the outer orifice. The sol pH was 9.1-9.2.

The sol was directed onto a spinning disc and sprayed into a chamber. When the droplets reached the bottom of the chamber, they had gelled. the gel was collected in water, then exchanged for 2 hours with sufficient 2.1% $(NH_4)_2SO_4$ solution to cover the gel. The ammonium exchange was followed by nine exchanges with 1.5% $Al_2(SO_4)_3$ solution for ½ hour each. After washing with water for at least 7 hours, the gel particles were covered with a 1.2% $RECl_3.6H_2O$ (RE=rare earth mixture) solution for a 3-hour treatment. Finally, the gel was washed chloride-free.

The gel was formed by passing it through a colloid mill (Charlotte Mill) and a Manton-Gaulin homogenizer with sufficient water added to produce a gel slurry of the correct consistency for spray drying. The spray-dried material contained 0.14% Na, 2.86% $RE_2O_3$ and 13.0% $H_2O$.

For impregnation, 3000 g of the spray-dried catalyst was slurried with a mixture of 526 g of 50% $RECl_3.6H_2O$ solution and 3330 g $H_2O$ and stirred for 12 hours. The slurry was then filtered, but not washed, and dried at 250° F. for 40 hours.

The catalysts of the other examples were prepared by similar procedures:

EXAMPLE 2

Acid alum and silicate solutions had the same composition as in Example 1.
Fines-silicate forming stream:
 53.36% silicate solution
 0.46% $H_2O$
 10.67% of 30% REY (3% Na) slurry
 15.74% of 55% Georgia kaolin slurry
 19.76% of 15% recycle (ball-milled) slurry Acid alum and fines-silicate were preheated as before and nozzle-mixed at the rate of 270 cc of fines-silicate and 217 cc of acid alum per minute. The sol pH was 9.2-9.3. The spherical gel particles obtained by spraying the sol with a spinning disc of 6" diameter were collected in 2.1% $(NH_4)_2SO_4$ solution, where they remained for 2 hours. The ammonium exchange was followed by nine ½-hour exchanges with 1.5% $Al_2(SO_4)_3$ solution, 7 hours of water wash and a 2-hour exchange with 1.2% $RECl_3.6H_2O$ solution as in Example 1. The procedure for homogenization and spray-drying was the same as in Example 1. The spray-dried material contained 0.10% Na, 2.47% $RE_2O_3$ and 13.8% $H_2O$. The impregnation procedure was also the same as in Example 1.

EXAMPLE 3

Acid alum and silicate solutions had the same composition as in Example 1.
Fines-silicate forming stream:
  53.36% silicate solution
  0.44% $H_2O$
  13.34% of 30% REY (3% Na) slurry
  13.09% of 60% Georgia kaolin slurry
  19.76% of 15% recycle (ball-milled) slurry
The recycle contained 15% REY.

Acid alum and fines-silicate were nozzle-mixed at the rate of 390 cc of fines-silicate and 327 cc of acid alum per minute; the inner orifice was 0.036". Collection and base-exchange of the gel was done in the same manner as in Example 2, except that the rare earth chloride solution contained 1.5% $RECl_3.6H_2O$ because of the higher REY content of the gel. The procedure for homogenizing and spray-drying was the same as in Example 1. The spray-dried material contained 0.10% Na, 3.15% $RE_2O_3$ and 12.3% $H_2O$. Impregnation was done in the same manner as in the prior examples.

EXAMPLES 4 to 6

Acid alum and silicate solutions had the same composition as in Example 1.
Fines-silicates forming stream:
  53.36% silicate solution
  11.06% $H_2O$
  14.82% of 30% REY (3% Na) slurry
  20.75% of 50% Georgia kaolin slurry
Acid alum and fines-silicate were preheated to 92° F. and at a rate of 755 cc of fines-silicate and 640 cc of acid alum per minute. The gel pH was 9.1. The gel was sprayed with a 4" disc, processed, homogenized and spray-dried in the same manner as in Example 3, except that the ammonium exchange lasted only 1 hour. The spray-dried material contained 0.11% Na, 3.27% $RE_2O_3$ and 20.0% $H_2O$.

The catalyst was impregnated to three different $RE_2O_3$ levels by agitating the catalyst in a $RECl_3$ solution for 30 minutes.

| Examples | 4 | 5 | 6 |
|---|---|---|---|
| Wt. of catalyst, g | 2000 | 2000 | 2000 |
| Wt. of $H_2O$, g | 2305 | 2220 | 2135 |
| Wt. of 50% $RECl_3.6H_2O$, g | 180 | 350 | 520 |

The impregnated catalysts were dried at 250° F. as before.

EXAMPLE 7

The gel of this example was prepared in the same manner as in Examples 4–6. The ammonium exchange was extended to 2 hours. Otherwise, the wet processing, homogenizing and spray-drying were the same as in Example 4–6. Impregnation was done as in Example 5.

EXAMPLE 8

The gel of this example was prepared in the same manner as in Examples 4–6. The gel was collected in water. There were no ammonium exchange, only nine ½-hour exchanges with 1.5% $Al_2(SO_4)_3$ solution. Further processing was identical to Examples 4–6. The spray-dried material contained 0.09% Na, 3.54% $RE_2O_3$ and 13.1% $H_2O$.

For impregnation, 3000 g of this catalyst was slurried with a mixture of 3300 g $H_2O$ and 500 g of 50% $RECl_3.6H_2O$ solution and stirred for 30 minutes. The slurry was then filtered, but not washed, and dried at 250° F.

The composition and the cracking activity of the above products are summarized in Table 1. The charge stock used in the cracking runs was Durban Fresh Feed, described in Table 2.

TABLE 1

| Example | 1 | 2 | 3 | 4 | 5 | 6 | 7 | 8 | A[5] | B[5] |
|---|---|---|---|---|---|---|---|---|---|---|
| REY, wt. % [1] | 11.85 | 12 | 15 | 15 | 15 | 15 | 15 | 15 | — | — |
| Georgia Kaolin, wt. % [1] | 30.6 | 33 | 29.7 | 35 | 35 | 35 | 35 | 35 | — | — |
| Gel Matrix, wt. % [1] | 57.55 | 55 | 55.3 | 50 | 50 | 50 | 50 | 50 | — | — |
| Na, wt. % | 0.13 | 0.10 | 0.10 | 0.08 | 0.11 | 0.10 | 0.12 | 0.07 | 0.84 | 0.27 |
| $RE_2O_3$, wt. % | 6.84 | 7.01 | 7.21 | 5.66 | 8.08 | 9.51 | 7.28 | 6.52 | 0.13 | — |
| Apparent Density, g/cc | 0.62 | 0.73 | 0.70 | 0.72 | 0.73 | 0.73 | 0.69 | 0.80 | 0.84 | 0.73 |
| Pore Volume, cc/g [2] | 0.68 | 0.68 | 0.66 | 0.64 | 0.64 | 0.64 | n.d. | 0.38 | 0.47 | — |
| Cracking Activity [3] | | | | | | | | | | |
| Cat/Oil | 2.98 | 3.03 | 2.99 | 2.95 | 3.00 | 2.95 | 2.96 | 2.98 | 2.99 | 2.99 |
| WHSV | 8.38 | 8.22 | 8.34 | 8.43 | 8.30 | 8.43 | 8.41 | 8.35 | 8.34 | 8.32 |
| Temperature, °F. | 962 | 960 | 958 | 953 | 953 | 946 | 958 | 951 | 956 | 949 |
| Conversion, vol. % | 73.7 | 72.2 | 74.4 | 76.7 | 75.2 | 73.4 | 75.8 | 76.1 | 79.7 | 68.5 |
| $C_5^+$ Gasoline, vol. % | 60.8 | 59.6 | 60.1 | 60.3 | 60.3 | 61.3 | 59.9 | 60.3 | 60.4 | 56.5 |
| $C_4$'s vol. % | 15.0 | 14.4 | 15.2 | 16.6 | 16.0 | 14.2 | 17.3 | 16.5 | 17.6 | 14.4 |
| Dry Gas, wt. % | 7.9 | 7.8 | 7.9 | 8.5 | 8.3 | 7.4 | 8.0 | 8.1 | 9.4 | 6.8 |
| Coke, wt. % | 2.81 | 2.40 | 3.15 | 4.47 | 3.60 | 2.82 | 3.72 | 4.21 | 6.41 | 3.18 |
| After Severe Steaming [4] | | | | | | | | | | |
| Cat/Oil | 2.99 | — | 3.00 | — | 2.99 | — | 2.98 | — | 2.99 | 2.99 |
| WHSV | 8.32 | — | 8.30 | — | 8.32 | — | 8.35 | — | 8.34 | 8.34 |
| Temperature, °F. | 950 | — | 956 | — | 959 | — | 956 | — | 949 | 948 |
| Conversion, vol. % | 67.2 | — | 73.4 | — | 71.4 | — | 70.6 | — | 64.2 | 59.5 |
| $C_5^+$ Gasoline, vol. % | 56.0 | — | 60.4 | — | 59.5 | — | 56.3 | — | 54.7 | 48.0 |
| $C_4$'s vol. % | 12.8 | — | 14.6 | — | 13.2 | — | 14.8 | — | 13.2 | 12.6 |
| Dry Gas, wt. % | 6.7 | — | 7.9 | — | 7.4 | — | 7.8 | — | 5.9 | 6.0 |

TABLE 1-continued

| Example | 1 | 2 | 3 | 4 | 5 | 6 | 7 | 8 | A[5] | B[5] |
|---|---|---|---|---|---|---|---|---|---|---|
| Coke, wt. % | 2.74 | — | 2.72 | — | 2.88 | — | 3.27 | — | 2.63 | 2.86 |

[1] composition of insolubles before wet processing
[2] before impregnation
[3] after 4 hr. steaming at 1400° F. with 100% steam at atmospheric pressure
[4] 4 hr. steaming at 1475° F. with 100% steam at atmospheric pressure
[5] commercial catalysts having a crystalline aluminosilicate as the active ingredient.

TABLE 2

| COMPOSITION AND PROPERTIES OF CHARGE STOCK | |
|---|---|
| API Gravity | 24.2 |
| Aniline Point, °F. | 182.3 |
| Pour Point, °F. | 90 |
| Conradson Carbon, wt. % | 0.21 |
| Ramsbottom Carbon, vol. % | 0.28 |
| Sulfur wt. % | 2.12 |
| Total Nitrogen, wt. % | 0.097 |
| Basic Nitrogen, ppm | 268 |
| Hydrogen, wt. % | 12.39 |
| Kinematic Viscosity at 100° F. | 52.58 |
| Kinematic Viscosity at 210° F. | 5.88 |
| Heat 70°Combustion, BTU/lb. | 19,064 |
| Molecular Weight | 357 |
| Metal Analysis, ppm | |
| Copper | 0.2 |
| Iron | 0.6 |
| Nickel | 0.1 |
| Vanadium | 0.3 |
| Refractive Index at 70° C. | 1.4879 |
| Density by Pycnometer at 70° C., g/cc | 0.8751 |
| Distillation | D1160 |
| IBP | 502 |
| 5 | 610 |
| 10 | 646 |
| 20 | 716 |
| 30 | 724 |
| 40 | 756 |
| 50 | 786 |
| 60 | 815 |
| 70 | 843 |
| 80 | 873 |
| 90 | 909 |
| 95 | 930 |

As has already been mentioned, the catalyst of this invention is highly attrition resistant. The following illustrates this.

Determination of Attrition Index 7 cc of catalyst in a 1 in. i.d. "U" tube is contacted with an air jet formed by passing humidified (60%) air at 21 liters/min. through a 0.07 in. diameter nozzle. The attrition phase is performed in the Roller apparatus and fines in the 0–14μ (nominal) range are removed as formed and caught in a paper collection thimble. At the conclusion of the attrition phase, fines are recombined with residue and the particle size determined; the incremental weight of the collection thimble is added to the 0–20μ fraction. Particle size in all cases is determined with micromesh screens in a Sonic Sifter analyzer.

The attrition index is defined as the increase in the fines fraction (0–20μ) caused by the attrition phase:

$$AI \text{ (uncorr.)} = 100 \times \frac{\text{wt. \% (0-20}\mu\text{) After Attr.} - \text{wt \% (0-20}\mu\text{) Before Attr.}}{100 - \text{wt \% (0-20}\mu\text{) before attr.}}$$

Corrected AI = AI(uncorr.) × packed density (g/cc) Attrition indexes for other fractions (e.g. the 0–30μ or the 0–40μ fractions) can be determined similarly, but generally show the same behavior as 0–20μ indexes. We have found it necessary to use the particle size of the fresh (or as-received) catalyst as the reference. Calcination of the catalyst in a dish leads to an apparent loss of fines, probably by interaction of particles ("sticking"). The original particle size is effectively reestablished in the attrition phase.

The catalyst of this invention had an attrition index (0–20μ) of 0.3. The attrition indexes of six different commercially available catalysts ranged from a low of 3.0 up to 17.0 The commercial catalyst also had a crystalline aluminosilicate present as the active member. All attrition indexes are based on fresh catalyst particle size in all cases.

We claim:

1. A process for cracking a hydrocarbon charge under cracking conditions by contacting said hydrocarbon charge with an attrition asistant cracking catalyst prepared by the steps comprising:
   (1) nozzle-mixing of an acid alum stream with a second stream comprising sodium silicate, alkali metal hydroxide and suspended fines;
   (2) forming droplets of the resulting sol and causing them to gel;
   (3) exchanging the gel by contacting same, in order, with (a) an ammonium salt solution, (b) an aluminum salt solution and (c) a rare earth salt solution;
   (4) washing with water;
   (5) homogenizing;
   (6) spray drying;
   (7) impregnating with rare earth ions; and
   (8) drying.

2. The process of claim 1 wherein said fines are selected from the group consisting of crystalline aluminosilicate zeolites, alumina and clays.

3. The process of claim 1 wherein said droplets range in size from about 0.1 mm to about 15 mm.

4. The process of claim 1 wherein said fines includes a crystalline aluminosilicate zeolite comprising from about 5 to about 30% by weight.

5. The process of claim 1 wherein in step (3) at least 60% of the original cation is removed.

6. The process of claim 4 wherein said zeolite is rare earth exchanged zeolite Y.

* * * * *

UNITED STATES PATENT AND TRADEMARK OFFICE
CERTIFICATE OF CORRECTION

PATENT NO. : 4,219,406
DATED : August 26, 1980
INVENTOR(S) : Guenter H. KUEHL and Howard S. SHERRY It is certified that error appears in the above-identified patent and that said Letters Patent are hereby corrected as shown below:

Column 1, line 16, "sold" should read "solid".

Column 7, line 25, "70°" should read "of".

Signed and Sealed this

Third Day of February 1981

[SEAL]

Attest:

RENE D. TEGTMEYER

*Attesting Officer*   *Acting Commissioner of Patents and Trademarks*